April 21, 1942. A. T. HARRIS 2,280,485
CALCULATING DEVICE
Filed Sept. 9, 1940 5 Sheets-Sheet 3
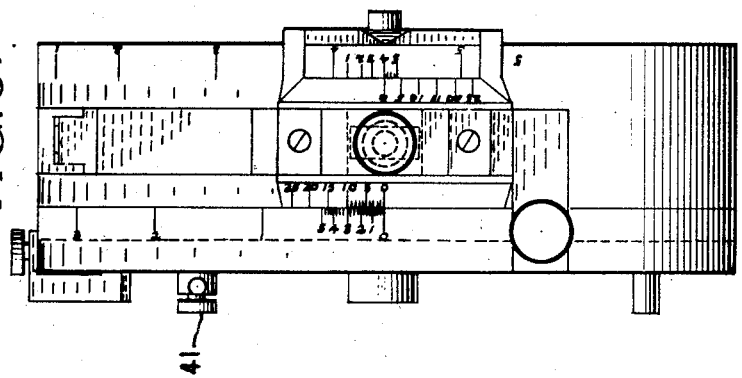
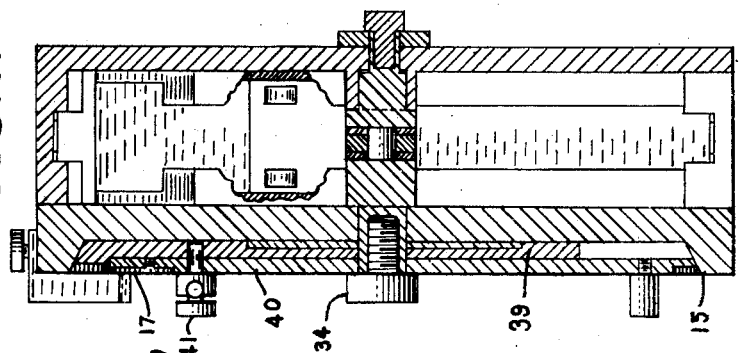
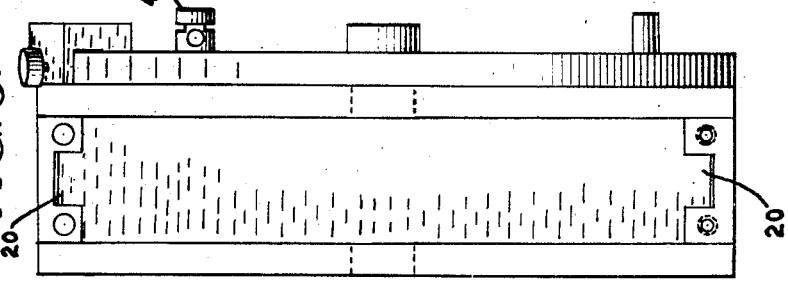
ALBERT T. HARRIS
*INVENTOR.*
BY
*ATTORNEY.*

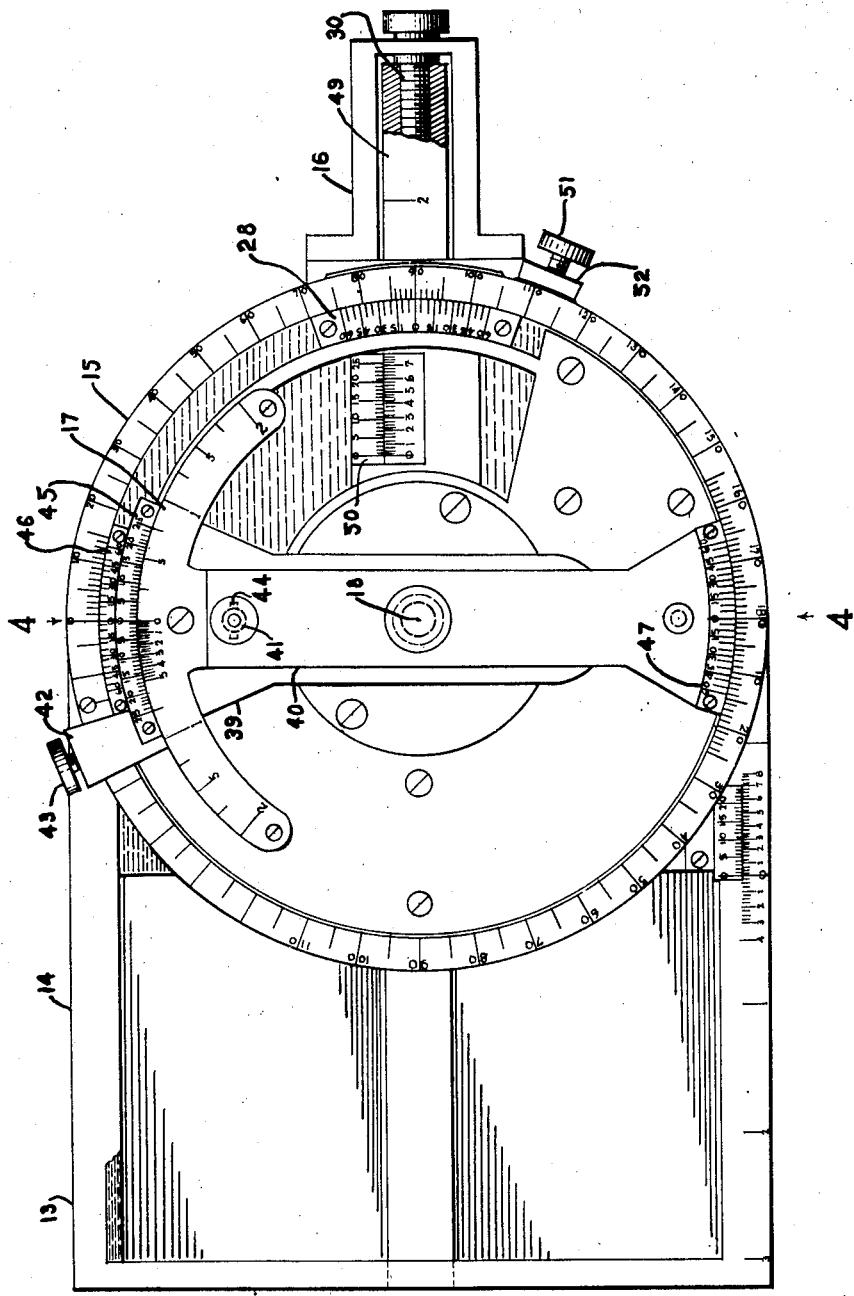

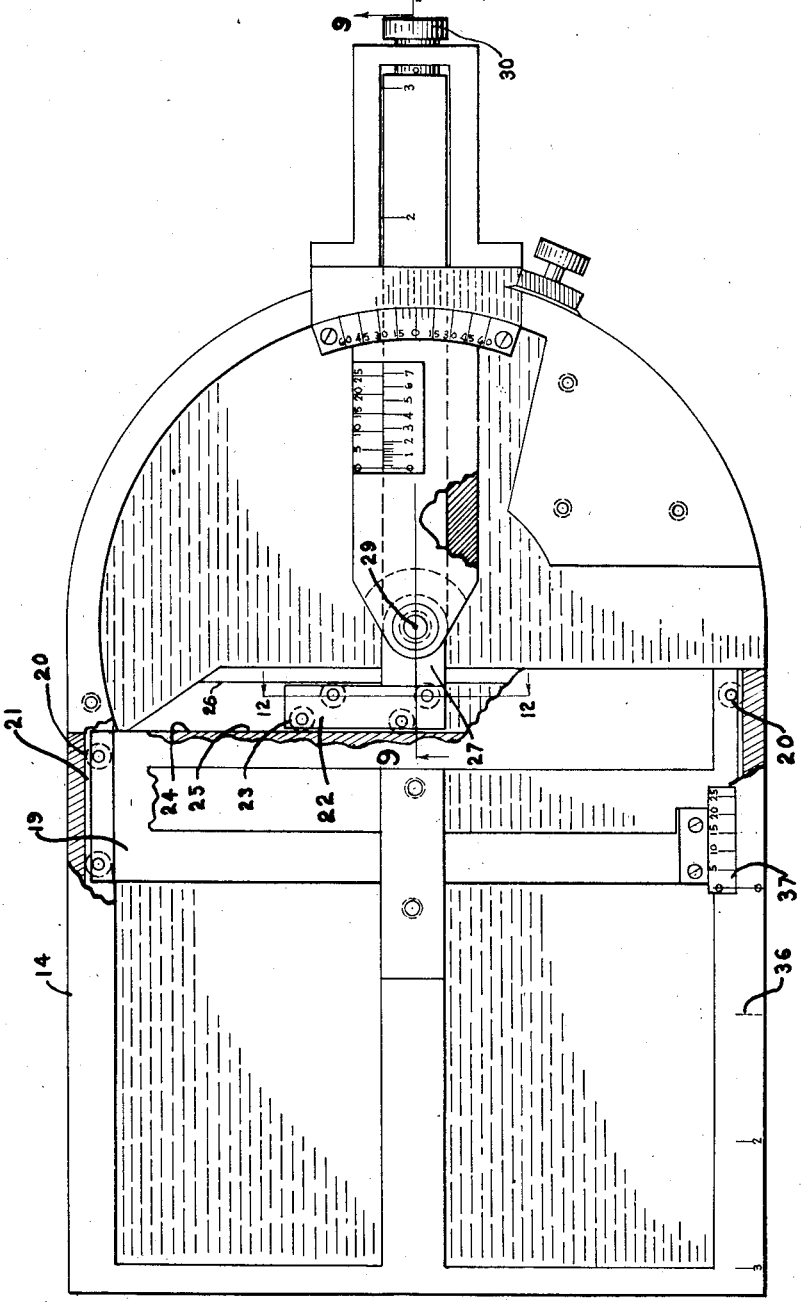

April 21, 1942.　　　A. T. HARRIS　　　2,280,485
CALCULATING DEVICE
Filed Sept. 9, 1940　　　5 Sheets-Sheet 4
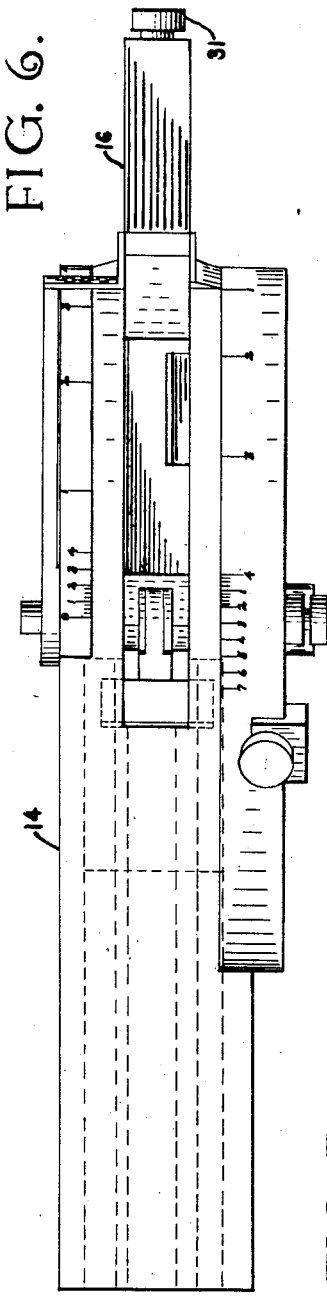
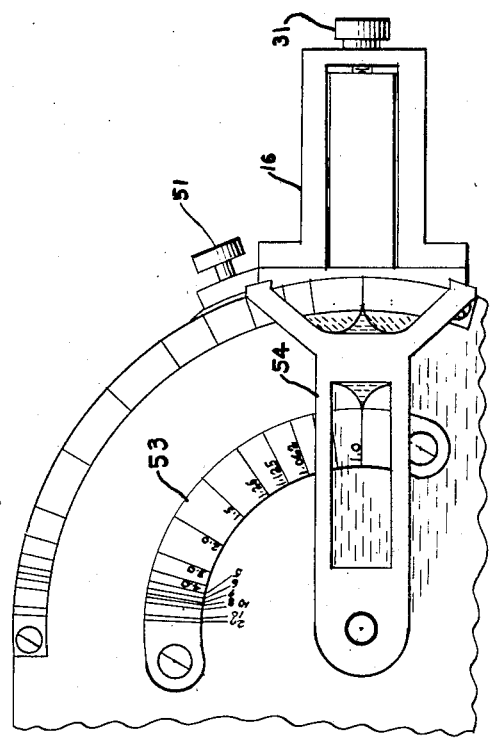
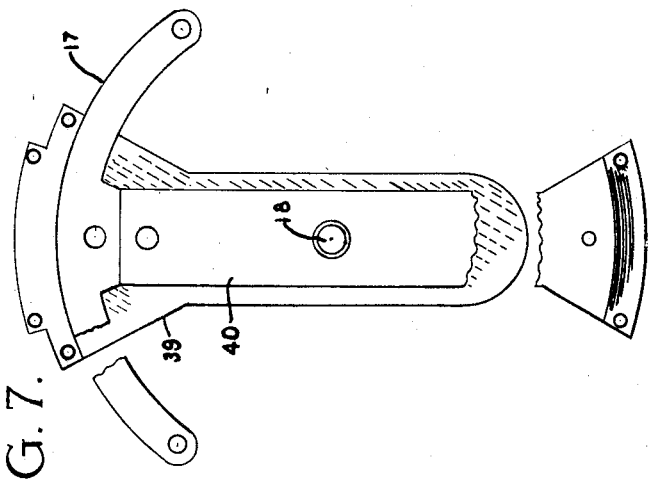
ALBERT T. HARRIS
*INVENTOR.*
BY *Herbert H. Smith*
ATTORNEY April 21, 1942.     A. T. HARRIS     2,280,485
CALCULATING DEVICE
Filed Sept. 9, 1940     5 Sheets-Sheet 5
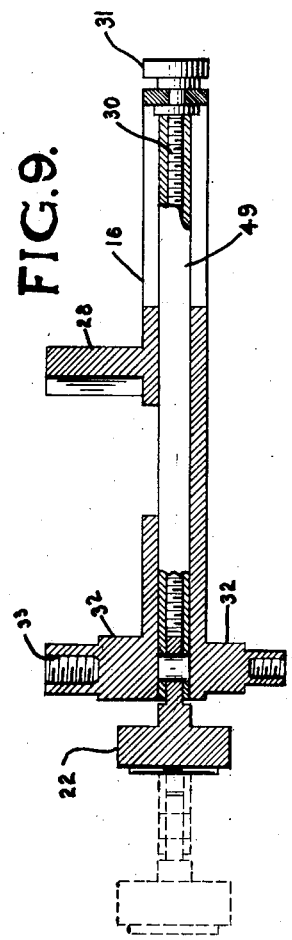
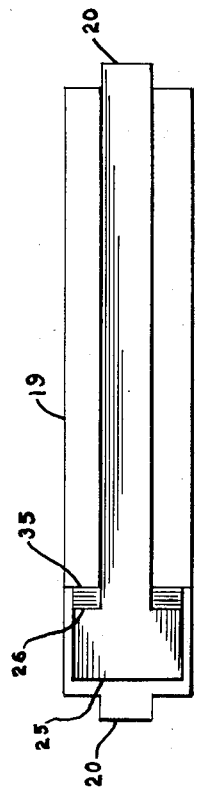
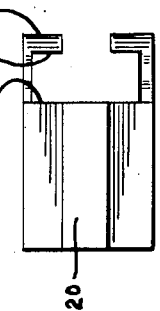
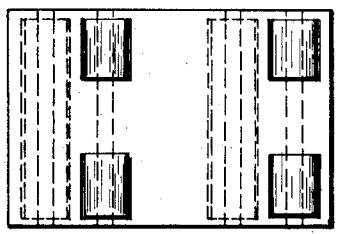
ALBERT T. HARRIS
*INVENTOR.*
BY *Herbert J. Smith*
*ATTORNEY*

Patented Apr. 21, 1942

2,280,485

UNITED STATES PATENT OFFICE 2,280,485

CALCULATING DEVICE

Albert T. Harris, New York, N. Y.

Application September 9, 1940, Serial No. 356,081

9 Claims. (Cl. 33—1)

This invention pertains to calculating devices and more particularly to a device for calculating mechanically the resultant vector of several vector quantities. A specific use of the device may be in conjunction with navigational problems for setting the course of a ship.

Throughout the specification it will be noted that the term "directions" and not the more nautical one "course" is used to avoid a loose use of the word "course." Definitions are set forth below to assist in explaining the various vector quantities that are incorporated herein to obtain mechanically the resultant vector.

The "course" is the direction in which the navigator wishes to have the vessel go in order to reach a desired destination.

The "heading" is the direction in which the vessel is steered. It may or may not differ from the course. It is often called the course steered.

The "track" is the direction in which the vessel has actually travelled and may or may not coincide with the intended "course" and the "heading."

The "bearing" of an object is its direction from the ship or in rare cases its direction from some other specified object.

It is to be understood that the calculating device is in fact a vectorial computer which may be used on any problems having vector quantities of direction and magnitude. Velocity, acceleration, displacement, motion, force, electric current, magnetic flux, stresses and strains, lines of force, flow of heat and liquids, all involve magnitude and direction, and all vector quantities that may be used in their respective problems can be computed on the calculating device set forth herein.

While it is specifically pointed out that a single use may be in conjunction with navigational problems, it is to be understood that the invention is not confined thereto and all uses are intended to be embraced by the claims.

It is well known that ships travelling from a given location to a distant objective must encounter elements such as wind and tide and that these quantities must be considered in working out the heading of the vessel. Bearings are taken to locate the vessel geographically and the course is then set.

With sailing vessels, the ship on the port tack actually moves in a direction to the right of her heading, while a ship on the starboard tack moves in a direction to the left of her heading, and in vessels having considerable leeway the navigator usually estimates the leeway by comparing the center line of the vessel with the wake and notes the approximate angle between them. The estimated leeway is then applied to the compass heading to obtain the true track. In using the present invention the leeway can be considered and incorporated in the calculations in determining the true track.

For a more comprehensive understanding of the invention reference may be had to the accompanying drawings and annexed specifications wherein like reference characters represents like parts.

Referring to the drawings:

Fig. 1 is a front view of the assembled device.

Fig. 2 is a front view partly broken away with the master dial and associated parts removed.

Fig. 3 is an end view of the right side of Fig. 1.

Fig. 4 is a cross sectional view taken along lines 4—4 of Fig. 1.

Fig. 5 is an end view of the left side of the device shown in Fig. 1.

Fig. 6 is a top view of the device shown in Fig. 1.

Fig. 7 is a front view of the master protractor pivotal members partly broken away.

Fig. 8 is a partial rear view showing the relation of the circular adjustment member in relation to the base.

Fig. 9 is a partially sectional view of the circular adjustment member shown attached to the cross slide movable member.

Fig. 10 is a view of the longitudinal slide member removed from the unitary structure; the view being taken from the right end of the device as shown in Fig. 2.

Fig. 11 is a left end view of the member shown in Fig. 10.

Fig. 12 is a view of the cross slide member taken along lines 12—12 of Fig. 2.

Referring to the drawings and more particularly to Fig. 1 the calculating device 13 is shown having a base 14 on which is mounted a master protractor 15 which is in fact a protractor having a unitary 360 degrees scale graduated to indicate two complete 180 degrees scales. A tangent adjustment member 16 is shown at the extreme right of Fig. 1. A master protractor pivotal member 17 is pivoted at point 18 and the master protractor pivotal member rotates within the confines of the master protractor.

Referred to Fig. 2 the base 14 has a master cross member 19 which has rollers 20 that are pivoted to the ends of the master cross member and movable in a groove 21 so that the master cross member may be moved longitudinally of the base. A secondary cross member 22 has rollers 23 thereon, which rollers slide in a groove 24 engaging the surfaces 25 and 26. The secondary cross member is secured to a stem 27 which is pivoted to the tangent adjustment member 16. A tangent adjustment vernier 28 is an integral part of the tangent adjustment member, which tangent adjustment member may be moved about the pivot point 29 and when the adjustment member is centrally located as shown on the 90 degree graduation in Fig. 1, a turning of the screw 30 will cause the master cross member to move longitudinally on the base. Assuming the tangent adjustment member is moved so that the zero reading on the tangent adjustment vernier is placed at 45 degrees, turning of the screw 30 will cause the master cross member to move toward the left side of the instrument represented in the drawings, but the movement will be less than would be the case if the zero reading of the tangent adjustment vernier were placed at 90 degrees as shown in Fig. 1.

The tangent adjustment member is shown in Fig. 9 having a screw 30 with a knob 31 at one end thereof while the other end thereof is pivoted to the secondary cross member 22 so that the secondary cross member may move longitudinally in the stem 49 of the tangent adjustment member as shown dotted in Fig. 9. Hubs 32 engage suitably shoulders within the instrument and have adjustment threaded female members 33 that receive knobbed screws 34, shown more clearly in Figs. 3 and 4, which knobbed screws hold the tangent adjustment member in pivotal relation with the base.

A detailed view of the master cross member shown in Fig. 10 may be referred to as a longitudinal slide with rollers 20 on the opposing ends thereof. Surfaces 25 and 26 are shown thereon as being guide surfaces for the secondary cross member 22. The upper surface 35 is shown in Fig. 11, as well as the surfaces 25 and 26, with the rollers 20 on one end thereof.

In Fig. 2 a graduated scale 36 is shown with the master cross member vernier 37 adjacent the graduated scale 36 so that positioning of the master cross member may be read on the scale 36 in conjunction with the vernier 37. The master protractor pivotal members are shown with the lower pivotal member 39 pivoted to the upper pivotal member 40 at point 18 having a snapping lock 41 to hold the two pivotal members in fixed position. A protruding member or key 42 is affixed to the lower pivotal member 39 and the protruding member or key 42 may be moved about the master protractor 17 and locked in any fixed position by turning the locking screw 43 if it is desirable to move the upper pivotal members, while the lower pivotal member is securely locked by turning the screw 43. The snap lock 41 may be raised and partially turned so that the protruding member or key 42 may be moved out of a complemental slot which engages the key 44. The lower pivotal member is secured to the master vernier 46, which is more clearly shown in Fig. 4 and its relative position is read in relation to the master protractor. The upper pivotal vernier 45 is held secured to the lower pivotal member and the vernier 45 is used in conjunction with the scale on the master protractor pivotal member or upper pivotal member 17, while the opposing end of the upper pivotal member can be read directly against the master protractor by vernier 47 in conjunction with the master protractor scale. When the upper and lower pivotal members are secured together by the snap lock arrangement 41 the zero readings on scales 45 and 17 register one with the other and the opposing end of the upper pivotal member will have its vernier reading 180 degrees from the zero reading on the scale of the lower protractor.

Referring to Figs. 1 and 2 it will be seen that the sleeve of the tangent adjustment members has graduations thereon which register with the vernier 50 so that as the screw 30 is turned in a clockwise direction the sleeve with its graduated scale thereon will move inwardly so that the graduations may register with the vernier scale 50. A locking screw 51 is secured to a shoulder 52, which is an integral part of the tangent adjustment member, so that the tangent adjustment member may be locked in any position by a clockwise rotation of the screw which engages the outer surface of the master protractor support.

Figs. 3, 4, and 5 show the snap lock arrangement 41 with the master cross member in position. The reference characters on Figs. 3, 4, and 5 are similar to those set forth in the remaining figures.

Fig. 8 shows a scale 53 secured to the bottom of the base and has a pointer 54 that registers with graduations on said scale 53.

Fig. 12 is a view of the cross slide member taken along lines 12—12 of Fig. 2 and shows more comprehensively the arrangement of rollers thereon to permit lateral movement of the secondary cross member within its guide means on the master cross member.

An application of the use of the calculating device is as follows:

Assume a ship is traveling due north and the distance from the location of the ship to its objective is 120 and the ship's speed is 120 miles per hour and there is a northeast wind at 30 miles per hour. The position of northeast is 45° on the compass dial.

First, divide the 120 miles in a certain given rule distance, say six inches. Therefore, six inches will be equal to 120 miles, or 20 miles to each inch of the given rule distance. If we have a 30 mile wind blowing from 45° (N.E.) we divide 120 by 30 which equals 4. Dividing six inches by 4 equals 1.5, which indicates we will have 1½" movement of the tangent member 49 shown in Fig. 1.

If the chart course is due north, which is 360°, with a deviation of 5° east and a variation of 5° east, with a northeast wind velocity of 30 miles per hour from a northeasterly direction we can add the 5° deviation and the 5° variation which gives a total of 10°.

To set this up on the instrument loosen lock nut 43 and swing both members 39 and 40 until zero on vernier 46 coincides with 10° on the master protractor 15. Subtract the 10° from the 45°, which is the direction of the wind, and the answer is 35°. To set this up, swing the tangent member until 35° is shown on the vernier and protractor 28 and 15 respectively. Then screw down member 31 until 1½" is read from vernier 50 and scale on tangent member. Read the result from scale and vernier 36 and 37. Next, unlatch lock pin 41 and swing member 40 in a clockwise direction, or to the direction from which the wind is blowing, equal to the measurement read from the scale and vernier 50 and 31. The exact course to steer the ship will be read directly from the master protractor and vernier 47. When this is done we know the course to be steered or the heading of the ship, which is different from the geographical course on the map.

The rules on the tangent member and the base member indicate inches, but may be centimeters or any other unit, and it is understood that these units may be representative of any measurement desired that may be worked out vectorially.

From the foregoing it will be seen that the calculating device set forth herein has a plurality of protractors and verniers in conjunction therewith and also has graduated rules or scales which are read in conjunction with their respective verniers. The vectorial computer or calculating device may be used for any suitable problem utilizing vectorial quantities and it is to be understood that the example set out herein is not to be construed as a limitation and all changes and equivalents are intended that are embraced by the scope of the appended claims. What I claim as new and desire to secure by Letters Patent of the United States is:

1. In a calculating device of the class described having a base member, side frames on said base member having longitudinal grooves therein, a cross member having rollers on the opposite ends thereof said rollers being adapted to move in said groove, said cross member also having a lateral groove substantially the width of said cross member, a slidable member having rollers thereon adapted to slide in said lateral groove, a stem secured to said member at substantially 90 degrees therefrom, a sleeve pivotally connected to said stem, a screw member threadedly connected to said sleeve, bracket means to support the threaded member, means on said threaded member to restrain the stem from longitudinal movement and to permit rotation thereof, and means on said bracket means to permit arcuate movement thereof about the pivotal point of the stem.

2. A calculating device substantially as set forth in claim 1 wherein the sleeve has graduations thereon, and a vernier scale placed adjacent said graduations of the stem to indicate the movement of the stem in relation to its respective vernier.

3. A calculating device as set forth in claim 1 wherein graduations are located longitudinally on the base, and a vernier scale adjacent said graduations to indicate relative longitudinal movement of the cross member in relation to the base.

4. A calculating device of the class described substantially as set forth in claim 1 wherein the bracket means has a vernier scale thereon, and a protractor stationary relative to the base to register with the vernier on the bracket.

5. In a vectorial computer of the class described having a base member, means on said base member having grooves therein adapted to receive rollers, a cross member having rollers thereon adapted to slide in said grooves, lateral means having grooves therein adapted to receive said rollers, a member movable laterally having rollers thereon adapted to move in last said groove, means pivotally connected to said lateral moving member having adjustment means thereon to actuate said lateral member and said cross member when the adjustment means are operated, and graduated means to indicate the relative movement of the lateral means and the longitudinally movable cross member.

6. A vectorial computer substantially as set forth in claim 5 wherein protractor means are provided to indicate the angular relation of the means pivotally connected to the laterally movable member in relation to the longitudinal center line of the vectorial computer protractor.

7. A vectorial computer of the class described having a base, movable means on said base having a predetermined direction of movement to represent a vector quantity, means angularly movable to the direction of movement of the first said means to represent a second vector quantity, and adjustment means on said angularly movable said means to cause said first means and second means to be varied when the adjustment means is actuated.

8. A vectorial computer substantially as set forth in claim 7 wherein graduated means are affixed to the device to indicate the amount of movement of the predetermined direction movable means, and means to indicate relation of the angularly movable means to the predetermined direction movable means.

9. A vectorial computer substantially as set forth in claim 7 wherein graduated means are provided on the adjustment means to indicate the amount of movement of said adjustment means from a predetermined given point.

ALBERT T. HARRIS.